3,002,005
7-METHYLPROGESTERONE

J Allan Campbell, Kalamazoo Township, Kalamazoo County, and John C. Babcock, Portage Township, Kalamazoo County, Mich., assignors to The Upjohn Company, Kalamazoo, Mich., a corporation of Michigan
No Drawing. Filed Oct. 24, 1958, Ser. No. 769,292
1 Claim. (Cl. 260—397.3)

This invention relates to novel steroids, more particularly 7-methylprogesterone, especially 7α-methylprogesterone and to a process for their production. These compounds can be represented by the following formula:

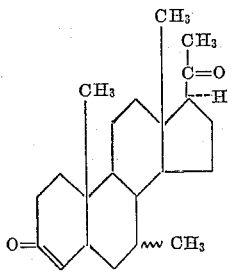

According to the present invention, 7-methyl-20-hydroxy-4-pregnen-3-one is oxidized, e.g., with sodium dichromate in acetic acid, to produce 7-methylprogesterone. If the starting compound is a mixture of 7α- and 7β-epimers, the reaction product will contain a mixture of 7α-methylprogesterone and 7β-methylprogesterone. The former compound can be isolated by fractional crystallization and/or chromatography, e.g., with an activated charcoal column. 7β-methylprogesterone is obtained in pure form in the manner described in Example 2.

The starting 7-methyl-20-hydroxy-4-pregnen-3-one is prepared from progesterone by reacting progesterone with pyrrolidine to form the 3-pyrrolidyl enamine thereof which is then reduced with lithium aluminum hydride to the 3-pyrrolidyl enamine of 20-hydroxy-4-pregnen-3-one. This compound is then hydrolyzed with dilute sodium hydroxide in methanol to 20-hydroxy-4-pregnen-3-one which is then reacted with chloranil to produce 20-hydroxy-4,6-pregnadien-3-one. This compound is reacted with methylmagnesium bromide in the presence of cuprous chloride to produce 7-methyl-20-hydroxy-4-pregnen-3-one.

7-methylprogesterone, especially 7α-methylprogesterone, possess useful pharmacologic activity, particularly modified progestational and gonadotropin inhibiting activity of improved therapeutic ratio. As is well known, progesterone produces typical changes in the estrogen-stimulated endometrium but at the same time produces other effects, such as, CNS depression, sedation, and sleep potentiation, changes in intra- and extra-cellular salt concentrations, changes in motor activity, prostate stimulation and the like. While still demonstrating valuable progestational and gonadotropin regulating properties, 7-methylprogesterone exhibits altered CNS and motor-depressing properties, salt effects, prostate effects and the like. In addition it exhibits valuable cardiotonic and anti-inflammatory activity. It can be administered to the animal organism, e.g., orally, intramuscularly or parenterally. For this purpose it can be combined with pharmaceutical diluents to form tablets, elixirs and suspensions for oral administration and sterile solutions and suspensions for parenteral administration.

7-methylprogesterone is useful as an intermediate in the production of various pharmacologically active, e.g., progestational, anti-inflammatory and salt and fluid regulating agents of improved therapeutic ratio, as exemplified hereinafter for 7α-methylprogesterone.

7α-methylprogesterone is converted to 7α-methyl-17α,21-dihydroxy-4-pregnene-3,20-dione and its 21-acyl esters in exactly the same manner as 11-ketoprogesterone is converted to hydrocortisone and cortisone and their esters, e.g., in the manner described in U.S. 2,790,814, 2,781,343, 2,769,825 and 2,769,823, i.e., by reaction with more than 2 molar equivalents each of sodium methoxide and ethyl oxalate to produce the 2,21-diglyoxalate; tribrominating with bromine followed by rearrangement with sodium methoxide in methanol to produce 2-bromo-3-keto-7α-methyl-4,17(20)-[cis]-pregnadien-21-oic acid methyl ester; removing the bromine with zinc and acetic acid and then reacting with pyrrolidine and p-toluene-sulfonic acid to produce the 3-pyrrolidyl enamine of 3-keto-7α-methyl-4,17(20)-[cis]-pregnadien-21-oic acid methyl ester; reducing this compound with lithium aluminum hydride and then hydrolyzing the 3-enamine group with sodium hydroxide and methanol to produce 7α-methyl-21-hydroxy-4,17(20)-[cis]-pregnadien-3-one; esterifying this compound, e.g., with acetic anhydride in pyridine, to produce the 21-acylate and then oxidatively hydroxylating with osmium tetroxide and an oxidizing agent, e.g., hydrogen peroxide or N-methylmorpholine oxide peroxide, to produce the corresponding 21-ester of 7α-methyl-17α,21-dihydroxy-4-pregnene-3,20-dione. These 21-esters are hydrolyzed with sodium bicarbonate in methanol under nitrogen to the corresponding 21-hydroxy compound. This 21-hydroxy compound is converted to other 21-esters by reaction with an acid chloride, bromide or anhydride or ester under ester exchange conditions or acid under esterification conditions, wherein the acyl radical of the esterifying agent is that of a hydrocarbon carboxylic acid, e.g., containing from 1 to 12 carbon atoms, e.g., acetic, propionic, octanoic, trimethylacetic, β-cyclopentylpropionic, succinic acid. This 21-hydroxy compound is converted with Septomyxa affinis, selenium dioxide, or other 1-dehydrogenating reagent, fungi or bacteria to 7α-methyl-17α,21-dihydroxy-1,4-pregnadiene-3,20-dione. [See Szpilfogel et al., Rec. Trav. Chim., 75 475, (1956); Vischer et al., Helv. Chim. Acta, 38, 835 (1955); ibid., p. 1503; Die Naturwissenshaften, 45, 266 (1958); British Patent 789,363; Belgian Patents 548,288 and 548,409; and U.S. 2,841,600], which is converted to 21-acyl esters thereof by reaction with an acylating agent, e.g., acetic anhydride in pyridine, in the manner described above.

Reacting 7α-methyl-17α,21-dihydroxy-4-pregnene-3,20-dione with methanesulfonyl chloride or other hydrocarbon sulfonyl halide according to procedures known in the art produces a 7α-methyl-17α,21-dihydroxy-4-pregnene-3,20-dione 21-sulfonate, e.g., 21-methanesulfonate, which is converted with sodium iodide in acetone, to 7α-methyl-17α-hydroxy-21-iodo-4-pregnene-3,20-dione. This compound is converted with zinc and acetic acid to 7α-methyl-17α-hydroxy-4-pregnene-3,20-dione. This compound is converted in the same manner as 17α-hydroxyprogesterone to a 17-lower-aliphatic, e.g., acetic, acid ester. These compounds possess potent oral progestational activity. Alternatively, 7α-methyl-17α-hydroxyprogesterone can be converted with Septomyxa affinis or other 1-dehydrogenating agent to 7α-methyl-17α-hydroxy-1,4-pregnadiene-3,20-dione in the same manner as described above which can also be converted to 17-lower-aliphatic acid esters, e.g., acetate, which also possess oral progestational activity.

The following preparations and examples are illustrative of the process and products of this invention but are not to be construed as limiting.

PREPARATION 1
*20-hydroxy-4-pregnen-3-one*

A stirred solution of 126.4 g. of progesterone and 800 ml. of methanol was heated to boiling and without further heating 95 ml. of pyrrolidine was added over a 10 minute interval. After another 10 minutes the solution was cooled to 4° C. and maintained at this temperature for 3 hours. The yellow precipitate was separated by filtration, washed with about 200 ml. of cold methanol and dried in a vacuum at 45° C. There was obtained a 98.5 percent yield of 3-pyrrolidyl-3,5-pregnadien-20-one melting at 175° C. (dec.).

To a stirred solution of 13.2 g. of lithium aluminum hydride in 880 ml. of tetrahydrofuran was slowly added under nitrogen a solution of 44g. of 3-pyrrolidyl-3,5-pregadien-20-one in 440 ml. of dry benzene. After 30 minutes, 88 ml. of ethyl acetate was cautiously added followed by 200 ml. of water. The solution was concentrated under vacuum until about 500–600 ml. of distillate had been collected. To the concentrate containing the 3-pyrrolidyl-20-hydroxy-3,5-pregnadiene was added 400 ml. of methanol and 440 ml. of 5 percent aqueous sodium hydroxide. The mixture was heated at 45–50° C. for 45 minutes and then neutralized with 146 ml. of acetic acid. The organic solvents were removed under vacuum. The remaining aqueous slurry was mixed with 110 ml. of concentrated hydrochloric acid in 740 ml. of water. After stirring for 30 minutes the precipitate was separated by filtration, washed several times with water by slurrying and then dried at 60° C. under vacuum to give a 94.6 percent yield of a mixture of 20α-hydroxy-4-pregnen-3-one and 20β-hydroxy-4-pregnen-3-one.

PREPARATION 2

20-hydroxy-4,6-pregnadien-3-one

A solution of 12 g. of the thus-produced mixture of epimers of 20-hydroxy-4-pregnen-3-one and 10 g. of chloranil in 500 ml. of acetone was refluxed for 4.5 hours. The acetone was then distilled under nitrogen. The residue was dissolved in methylene chloride and ethyl acetate and then shaken with dilute sodium hydroxide. The thick green precipitate that formed was separated by filtration through diatomaceous earth. The organic phase of the filtrate was separated and washed with dilute sodium hydroxide, water and then dried. The solvent was distilled leaving a crystalline residue of 20-hydroxy-4,6-pregnadien-3-one which was triturated with ether to give 6.5 g. having a $\lambda_{max.}$ 287 m$\mu$. An additional 0.5 g. was obtained from the liquors.

PREPARATION 3

7α-methyl-20-hydroxy-4-pregnen-3-one

To a mixture of 200 ml. of tetrahydrofuran, 100 ml. of 3 M. methylmagnesium bromide in ether and 1.6 g. of cuprous chloride was slowly added with cooling and stirring a solution of 7.0 g. of 20-hydroxy-4,6-pregnadien-3-one in 100 ml. of tetrahydrofuran. The cooling bath was then removed and after 25 minutes the reaction mixture was poured into a mixture of ice and dilute hydrochloric acid saturated with sodium chloride. The mixture was extracted thoroughly with ether and the ether extracts were washed with brine, dilute sodium hydroxide saturated with sodium chloride and then again with brine. The ether solution was dried with magnesium sulfate and the ether distilled, leaving a mixture of 7α- and 7β-methyl-20-hydroxy-4-pregnen-3-one as an amorphous fluffy solid.

EXAMPLE 1

7α-methylprogesterone

The amorphous solid obtained in the manner described in preparation 3 was dissolved in 25 ml. of acetic acid and 7 g. of sodium dichromate dihydrate in 50 ml. of acetic acid was added with cooling. After 4 hours the solution was diluted with water and extracted several times with ether. The extracts were washed with dilute sodium hydroxide, water and then dried. The solvent was removed by distillation leaving a residue which still showed hydroxyl infrared adsorption. Therefore, the oxidation procedure was repeated and the residue obtained was chromatographed through a 200 g. magnesium silicate (Florisil) column. The column was developed with hexanes containing increasing proportions of acetone. 7α-methylprogesterone was eluted with hexanes containing from 6–7 percent acetone and melted, after two crystallizations from a mixture of hexanes and acetone, at 191–199° C., had a $$\lambda^{alc.}_{max.}\ 242 m\mu,\ a_M = 16,900$$

an $[\alpha]_D + 197°$ (CHCl$_3$) and the analysis below.

Calculated for $C_{22}H_{32}O_2$: C, 80.44; H, 9.82. Found: C, 80.08; H, 9.81.

EXAMPLE 2

7β-methylprogesterone

The amorphous mixture described in Preparation 3 is boiled with about an equal weight of chloranil in tertiary butyl alcohol for about two hours. The solvent is distilled and the residue taken up in methylene chloride which is then washed with dilute aqueous sodium hydroxide and then water. The methylene chloride solution is then dried and poured through a magnesium silicate (Florisil) chromatographic column. The column is developed with hexane containing increasing proportions of acetone. The hexanes plus 6–10 percent acetone eluted 7-methyl-20-hydroxy-4,6-pregnadien-3-one which is purified by crystallization.

7-methyl-20-hydroxy-4,6-pregnadien-3-one is oxidized in the manner described in Example 1 to 7-methyl-4,6-pregnadiene-3,20-dione. This compound is then reduced with pre-reduced 5 percent Pd on carbon in dimethylformamide until about 1.3 molar equivalents of hydrogen has been absorbed. The catalyst is removed, the solvent removed from the filtrate and the residue chromatographed in the manner described above to give 7β-methylprogesterone as an eluted product.

We claim:

7α-methylprogesterone melting at 191–199° C.

References Cited in the file of this patent

UNITED STATES PATENTS

| 2,838,534 | Babcock et al. | June 10, 1958 |
| 2,897,219 | Wettstein | July 28, 1959 |

FOREIGN PATENTS

| 546,555 | Canada | Sept. 24, 1957 |

OTHER REFERENCES

Fieser et al.: "Natural Products Related to Phenanthrene," third edition (New York: Reinhold Pub. Corp., 1949), page 385 only needed.